US012597224B2

(12) United States Patent
Anand et al.

(10) Patent No.: US 12,597,224 B2
(45) Date of Patent: Apr. 7, 2026

(54) SYSTEM AND METHOD FOR FEATURE SUB-IMAGE DETECTION AND IDENTIFICATION IN A GIVEN IMAGE

(71) Applicant: TriSpace Technologies (OPC) Pvt Ltd., Bengaluru (IN)

(72) Inventors: Narasimhan Vijay Anand, Bengaluru (IN); Thirumuru Chakradhar Reddy, Bengaluru (IN)

(73) Assignee: TriSpace Technologies (OPC) Pvt Ltd., Bengaluru (IN)

( * ) Notice: Subject to any disclaimer, the term of this patent is extended or adjusted under 35 U.S.C. 154(b) by 344 days.

(21) Appl. No.: 18/359,335

(22) Filed: Jul. 26, 2023

(65) Prior Publication Data

US 2025/0014306 A1     Jan. 9, 2025

(30) Foreign Application Priority Data

Jul. 3, 2023     (IN) .............................. 202341044604

(51) Int. Cl.
*G06K 9/00*     (2022.01)
*G06V 10/25*     (2022.01)
*G06V 10/44*     (2022.01)
(52) U.S. Cl.
CPC .............. *G06V 10/44* (2022.01); *G06V 10/25* (2022.01)
(58) Field of Classification Search
CPC ...... G06V 10/44; G06V 10/25; G06V 10/955; G06T 1/20; G06N 3/045; G06N 3/08; G06N 3/063; G06N 3/044
See application file for complete search history.

(56) References Cited

U.S. PATENT DOCUMENTS

| | | | |
|---|---|---|---|
| 10,390,309 B1 | 8/2019 | Anand | |
| 11,330,526 B2 | 5/2022 | Anand | |
| 2002/0116595 A1* | 8/2002 | Morton | ................. G06F 9/3885 |
| | | | 711/E12.051 |

(Continued)

FOREIGN PATENT DOCUMENTS

IN          422733 B     2/2023

OTHER PUBLICATIONS

Examination Report from corresponding application 202341044604 issued on Sep. 28, 2023, 7 pages.

*Primary Examiner* — Gregory A Morse
*Assistant Examiner* — Owais I Memon
(74) *Attorney, Agent, or Firm* — J. Peter Paredes; Amin Wasserman Gurnani LLP

(57)          ABSTRACT

The present invention provides a system and method for detection and identification of feature sub-image in a given image. The system (100) comprises single CPY core with Single Instruction Multiple Data (SIMD) instruction set but the instructions lack saturation logic (101), wherein the software modules are implemented. Removing the logic hardware used to implement saturation in the SIMD instructions helps in lowering the BoM cost and the inventive steps helps in achieving bit-exact results without saturation logic. The power consumed using CPU without saturation logic in SIMD instruction is lesser than using Digital Signal Processing Instruction Set Architecture with saturation logic, thus giving value additions to platform SoC designers and makers for using low BoM cost solution.

2 Claims, 3 Drawing Sheets

(56) References Cited

U.S. PATENT DOCUMENTS

| | | | |
|---|---|---|---|
| 2002/0181775 A1* | 12/2002 | Matsugu | G06V 10/454 |
| | | | 382/195 |
| 2004/0034760 A1* | 2/2004 | Paver | G06F 9/3824 |
| | | | 712/E9.046 |
| 2018/0293731 A1 | 10/2018 | Palaniyappan et al. | |
| 2020/0167932 A1 | 5/2020 | Ho | |
| 2021/0377868 A1* | 12/2021 | Anand | H04W 52/0261 |
| 2022/0215201 A1 | 7/2022 | Dwivedi et al. | |
| 2023/0069310 A1* | 3/2023 | Myronenko | G06T 7/11 |

* cited by examiner

100

Feature sub - image detection and identification in a given image

Software for detection
and identification of
feature sub-image in a
given image.

No saturation logic in
SIMD instruction set.

101

System-On-Chip (SoC)

System Bus

CPU with SIMD instructions, no saturation logic in the SIMD instruction feature sub-image detection and identification software in a given image

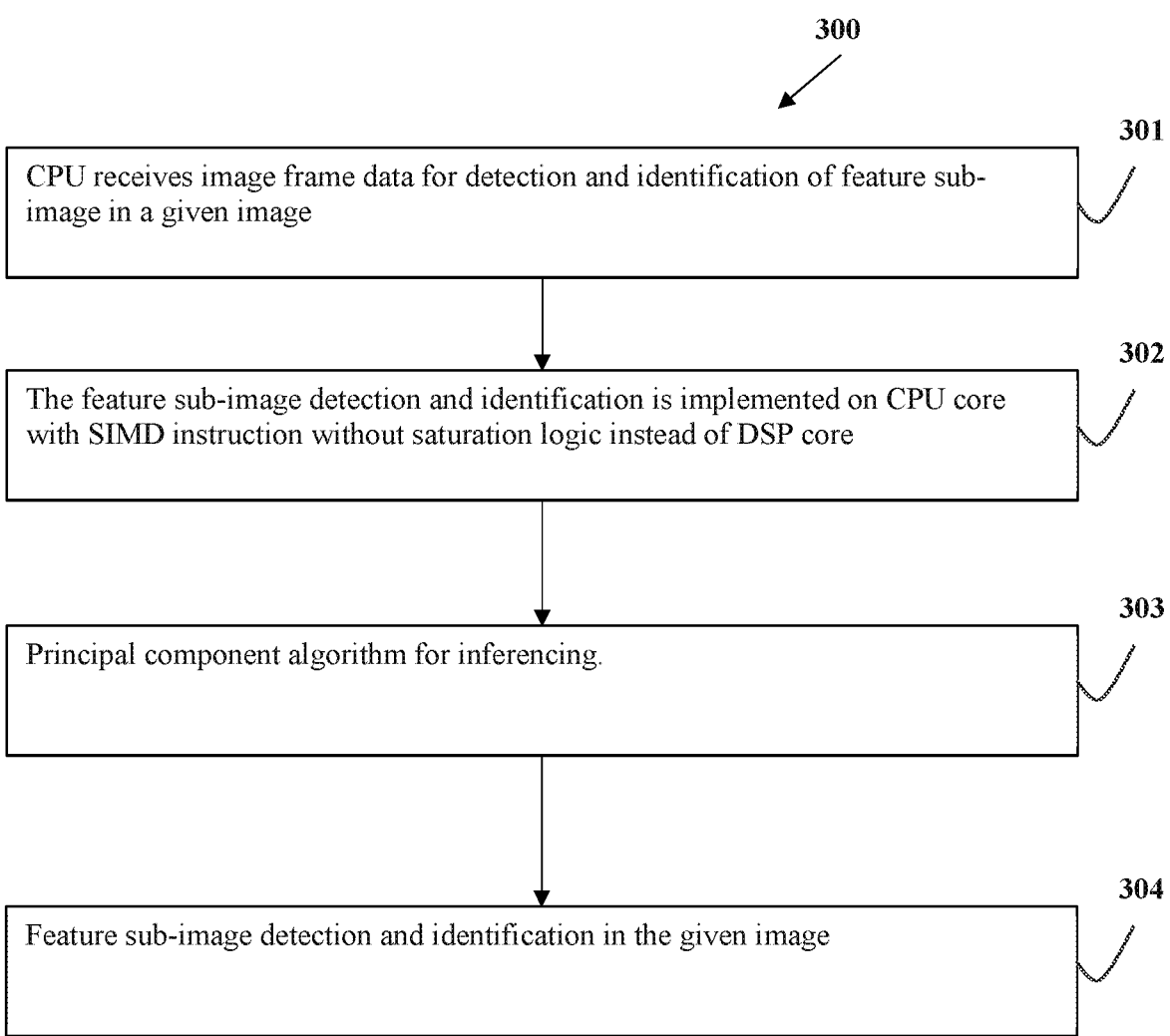

300

301

CPU receives image frame data for detection and identification of feature sub-image in a given image

302

The feature sub-image detection and identification is implemented on CPU core with SIMD instruction without saturation logic instead of DSP core

303

Principal component algorithm for inferencing.

304

Feature sub-image detection and identification in the given image

SYSTEM AND METHOD FOR FEATURE SUB-IMAGE DETECTION AND IDENTIFICATION IN A GIVEN IMAGE

CROSS-REFERENCE TO RELATED APPLICATIONS

The present application claims priority to Indian patent application serial no. IN 202341044604, filed Jul. 3, 2023, herein incorporated by reference in its entirety.

FIELD OF THE INVENTION

The present invention relates to a system and method for detection and identification of feature sub-image in the given image. Detection and identification software module is implemented on a Central Processing Unit (CPU) with Single Instruction Multiple Data (SIMD) instructions without 10 saturation logic hardwired in the SIMD instructions instead of implementing on a Digital Signal Processor (DSP) Instruction set Architecture (ISA).

BACKGROUND OF THE INVENTION

Platform SoC typically consists of CPU(s) cores, DSP(s) cores, and a GPU core. Platform SoC is used in building different kind of handheld gadgets such as Mobile handsets, Drones, Battery management system, and so on. Signal Processing algorithms are typically implemented on a DSP core in the SoC.

Detection and identification of feature sub-image in the given image is a case of signal processing algorithm and is typically implemented on DSP core.

We use CPU core with SIMD instructions lacking saturation logic instead of a DSP core in this invention for implementing the detection and identification feature algorithm. The DSP core with its rich ISA uses far more logic gates and greater chip area than a CPU.

Having a CPU core ISA with only SIMD extensions and lacking saturation logic except for three instructions namely ADD, SUB and a dedicated SAT instruction, the BoM cost of resulting CPU core is much lesser than DSP core. Getting bit-exact results and power optimal solution on CPU with this SIMD instruction without saturation logic is challenging. This invention achieves results of implementing detection and identification of feature sub-image in a given digital image on CPU whilst achieving better power performance and lowering BoM cost.

The U.S. patent document U.S. Pat. No. 11,330,526 titled "System and method for optimizing power consumption in video communication in mobile devices" discloses a method and apparatus for optimizing power consumption in mobile devices by suitable Instruction Set Architectural feature changes and optimal implementation of video codecs. However, the solution is aimed at power optimization of the encoder/decoder of video data.

SUMMARY OF THE INVENTION

The present invention overcomes the drawbacks in the prior art and provides a system and method for detection and identification of feature sub-image in a given image using optimal BoM cost and power-performance of platform SoC.

The system comprises CPU core in the platform SoC, for implementing the feature detect and identification algorithm. Digital image data of resolution 8 bits, 10 bits, is provided to the CPU for this purpose along with feature sub-image.

In an embodiment of the invention, digital image signal is analyzed via software methods, the software implemented in the CPU having SIMD instruction without saturation logic. The current consumption in the CPU is less than the case when DSP core with saturation logic built in the ISA is used for implementing the algorithm, and has added advantage of lowering BoM cost of platform SoC.

Thus, the present invention provides method to optimize the BoM cost of platform SoC for implementing feature detection and identification from a digital image while saving power consumption in implementing the same. Using a CPU core for the purpose instead of DSP core saves chip area and thereby reducing BoM cost of platform SoC.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

FIG. 3 illustrates a method for optimizing BoM cost of platform SoC for detecting and identifying feature sub-image in the given image whilst implementing the software on the platform SoC, according to one embodiment of the invention.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

In order to more clearly and concisely describe and point out the subject matter of the claimed invention, the following definitions are provided for specific terms, which are used in the following written description.

The present invention provides a system and method for optimizing BoM cost and power-performance of platform SoC for detecting and identification of feature sub-image in the given image. The system comprises single CPU core wherein, all software needed for inferencing of given sub-image in the given image is implemented on one CPU. The implementation of software modules in CPU with SIMD instruction without saturation logic instead of in DSP core results in up-to several thousand logic gates reduction in platform SoC.

Figure 1:
FIG. 1 illustrates a block diagram of a system for implementing software for detection and identification of feature sub-image in the given image in a CPU in the platform SoC, according to one embodiment of the invention.
Figure 1:
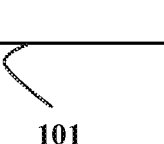

FIG. 1 illustrates a block diagram of a system for implementing extraction of tropological feature from an image in platform SoC, according to one embodiment of the invention. In a preferred embodiment, the system comprises a single CPU core (101) which is tasked with software for detection and identification of feature sub-image. The CPU has SIMD instructions without saturation logic built (101).

Figure 2:
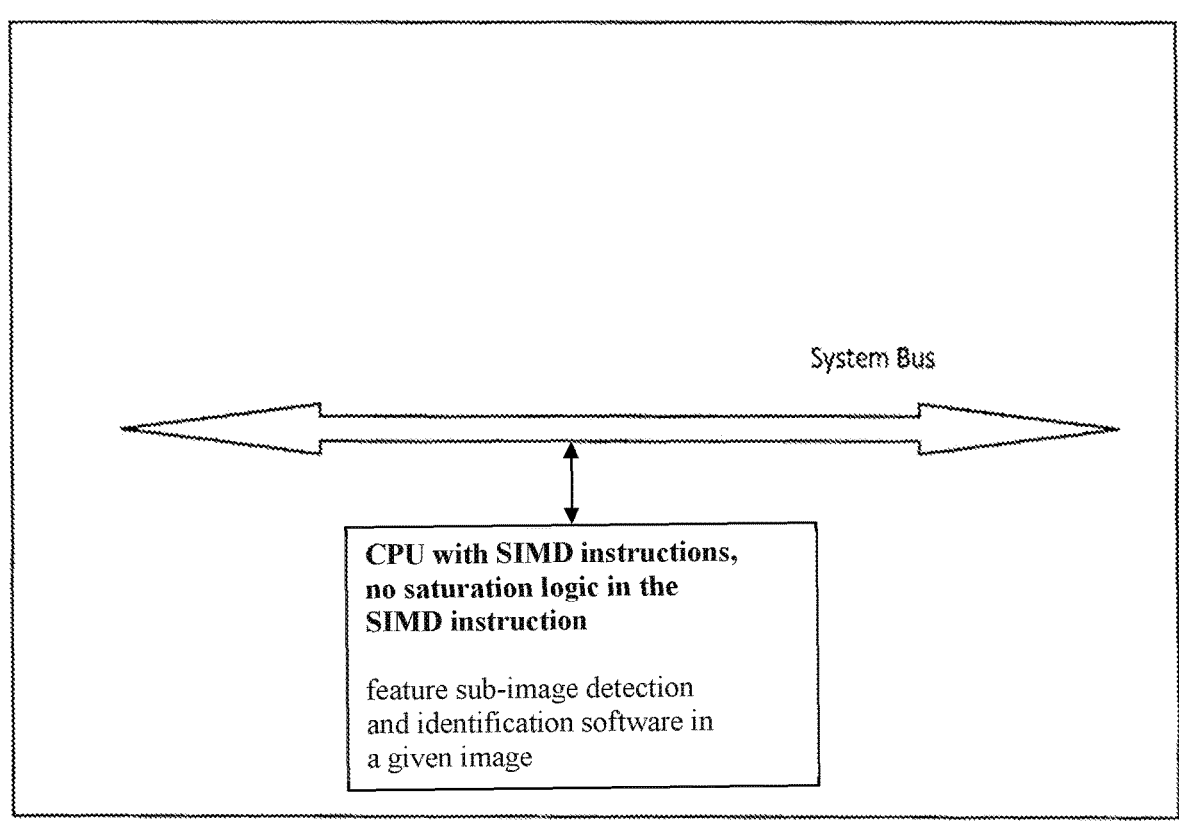
FIG. 2 illustrates a method for optimizing BoM cost of platform SoC for implementing feature detection and identification in a given image, according to one embodiment of the invention.

FIG. 2 In an embodiment of the invention, the implementation of feature detect and identification software on CPU core results in efficient implementation of software reducing the current consumption and BoM cost of platform SoC. The Architecture of the SoC contains single CPU core instead of using a DSP. Thus, lower BoM cost platform SoC is built while still providing better power consumption in the platform SoC for the purpose.

FIG. 3 illustrates the method for optimizing power consumption in feature detect and identification modules in the CPU, according to one embodiment of the invention. In a preferred embodiment, the method initiates with the step of receiving raw image at step 301.

At step 302, inferencing of feature sub-image in the image frame is implemented. The software modules are implemented on CPU with SIMD instructions without saturation logic. Principal component Analysis algorithm for inferencing is implemented at step 303.

At step 304, The sub-image feature detection and identification is outputted using threshold values of Euclidean distance of feature sub-image in the image. (101).

The inventive step in software module implemented on CPU with SIMD instructions is described now. The image frame samples are 8 bits/10 bits. It can fit in 16 bits of a 32-bit register, providing at least 6 guard bits in accumulating pixels intensities over adjacent block around an image pixel. The results don't overflow and therefore safe SIMD implementation without using saturation logic is safe. Principal component analysis algorithm is also similarly possibly without need for saturation logic in instruction set. The detection and identification of features is thus achieved, thus saving Bill of Material (BoM) cost and giving power savings in optimization of platform SoC with single CPU core, then using a DSP core.

Thus, the present invention provides a method to implement feature detection and identification with optimal BoM cost of platform SoC.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Software includes applications and algorithms. Software may be implemented in a smart phone, tablet, or personal computer, in the cloud, on a wearable device, or other computing or processing device. Software may include logs, journals, tables, games, recordings, communications, SMS messages, Web sites, charts, interactive tools, social networks, VOIP (Voice Over Internet Protocol), e-mails, and videos.

In some embodiments, some or all of the functions or process(es) described herein and performed by a computer program that is formed from computer readable program code and that is embodied in a computer readable medium. The phrase "computer readable program code" includes any type of computer code, including source code, object code, executable code, firmware, software, etc. The phrase "computer readable medium" includes any type of medium capable of being accessed by a computer, such as read only memory (ROM), random access memory (RAM), a hard disk drive, a compact disc (CD), a digital video disc (DVD), or any other type of memory.

All publications and patent applications mentioned in this specification are herein incorporated by reference to the same extent as if each individual publication or patent application was specifically and individually indicated to be incorporated by reference.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

We claim:

1. A system (100) for detection and identification of feature sub-image in a given image, the system (100) comprising:

a. a single Central Processing Unit (CPU) core with an Arithmetic Logic Unit (ALU) configuration and a non-transitory memory that stores software code, and Single Instruction Multiple Data (SIMD) instructions for executing software code for detection and identification of feature sub-image in a given image (101);

b. Principal component analysis algorithm and inferencing technique stored on the non-transitory memory to detect and identify feature sub-image in the given image;

c. saturation logic is turned off in the SIMD instructions of the software code; and d. the Arithmetic Logic Unit (ALU) of CPU is designed to have SIMD instructions without saturation logic in a critical instruction, wherein the critical instruction include Multiply and Accumulate (MAC) and shift instructions, wherein a Bill of Material (BoM) unit cost of a platform SoC consisting of CPU cores, DSP cores, and a GPU core is reduced compared to using a Digital Signal Processor (DSP) core to implement software modules by reducing a quantitative gate reduction by only including the CPU core and the GPU core for the platform SoC.

2. A system (100) for detection and identification of feature sub-image in a given image, the system (100) comprising:

a. a single Central Processing Unit (CPU) core with an Arithmetic Logic Unit (ALU) configuration and a non-transitory memory that stores software code, and Single Instruction Multiple Data (SIMD) instructions for executing software code for detection and identification of feature sub-image in a given image (101);

b. Principal component analysis algorithm and inferencing technique stored on the non-transitory memory to detect and identify feature sub-image in the given image;

c. saturation logic is turned off in the SIMD instructions of the software code; and d. the Arithmetic Logic Unit (ALU) of CPU is designed to have SIMD instructions without saturation logic in a critical instruction, wherein the critical instruction include Multiply and Accumulate (MAC) and shift instructions, wherein a Bill of Material (BoM) unit cost of a platform SoC consisting of CPU cores, DSP cores, and a GPU core is reduced compared to using a Digital Signal Processor (DSP) core to implement software modules by reducing a quantitative gate reduction by only including the CPU core and the GPU core for the platform SoC.

\*   \*   \*   \*   \*